United States Patent
Weber

[11] Patent Number: 5,921,522
[45] Date of Patent: Jul. 13, 1999

[54] FIXTURE FOR POSITIONING AN ELECTRICAL BOX

[76] Inventor: Scott D. Weber, 33142 Mesa Vista Dr., Dana Point, Calif. 92629

[21] Appl. No.: 08/763,329

[22] Filed: Dec. 10, 1996

[51] Int. Cl.⁶ .................................................. F16M 13/00
[52] U.S. Cl. ..................................... 248/544; 33/DIG. 10; 248/906; 269/904
[58] Field of Search ....................................... 248/544, 906, 248/201, 218.4, 205.1, 274.1, 295.11, 287.1, 411; 33/528, DIG. 10; 269/904

[56] References Cited

U.S. PATENT DOCUMENTS

| | | | |
|---|---|---|---|
| 2,919,913 | 1/1960 | Phair | 33/DIG. 10 |
| 2,956,798 | 10/1960 | Briggs | 33/DIG. 10 |
| 2,990,172 | 6/1961 | Gianotta | 33/DIG. 10 |
| 3,436,070 | 4/1969 | Utley et al. | 33/528 |
| 3,522,658 | 8/1970 | Howell | 33/180 |
| 3,767,151 | 10/1973 | Seal et al. | 248/906 |
| 3,875,669 | 4/1975 | Hull | 33/DIG. 10 |
| 3,954,717 | 5/1976 | Tarr | 269/904 |
| 4,706,359 | 11/1987 | Greenhill, Sr. et al. | 248/906 |
| 4,790,505 | 12/1988 | Rose et al. | 248/205.1 |
| 4,832,297 | 5/1989 | Carpenter | 248/205.1 |
| 4,850,115 | 7/1989 | Price et al. | 33/528 |
| 5,072,523 | 12/1991 | Bennett | 269/904 |
| 5,111,593 | 5/1992 | Gehen, Sr. | 33/DIG. 10 |
| 5,224,673 | 7/1993 | Webb | 248/27.1 |
| 5,288,041 | 2/1994 | Webb | 248/27.1 |
| 5,361,509 | 11/1994 | Wheeler, Sr. et al. | 33/528 |
| 5,423,499 | 6/1995 | Webb | 248/27.1 |

*Primary Examiner*—Ramon O. Ramirez
*Assistant Examiner*—Anita M. King
*Attorney, Agent, or Firm*—Gene Scott-Patent Law & Venture Group

[57] ABSTRACT

A utility box positioning fixture provides a box holding device onto which a utility box may be easily placed and held relative to the fixture. A set of jaw and spacer bars are mounted onto a vertically held support bar, the width of the jaw and spacer bars establishing the horizontal position of the utility box relative to a horizontal stringer and a vertical stud of a wall structure. With the utility box positioned against the side surface of the stud, and with the jaw bars positioned against the front face of the stud, the box is positioned for mounting and therefore may be accurately fastened into place on the stud.

6 Claims, 1 Drawing Sheet

FIXTURE FOR POSITIONING AN ELECTRICAL BOX

BACKGROUND OF THE INVENTION

1. Field of the Invention

This invention relates generally to assembly and positioning fixtures, and more particularly to a fixture for temporarily holding an electrical outlet box in a preferred position to facilitate its mounting.

2. Description of Related Art

The following art defines the present state of this field:

Webb, U.S. Pat. No. 5,423,499 describes an electrical junction box mounting bracket device and method. This bracket device is for mounting electrical devices in the interior space of hollow partitions having a front wall and back wall with an anterior space there between typically comprising a base capable of being fixedly attached to the floor, a riser extending upwardly from the base, the riser having front and rear faces, and supporting means for supporting a cover ring and a junction box which extends into the interior space.

Webb, U.S. Pat. No. 5,288,041 describes a bracket device for mounting electrical devices in the interior of hollow partitions having a front wall and back wall with a hollow space there between typically comprising a base capable of being fixedly attached to the floor, a riser extending upwardly from the base, and an annular plate having front and rear faces attached to the upper portion of the riser and having an opening there through sufficiently large to receive an electrical device accessible from the exterior side of the front wall, the annular plate also having means such as mounting holes for attaching a cover ring to its front face and a junction box to its rear face.

Webb, U.S. Pat. No. 5,224,673 describes a bracket device for mounting electrical devices in the interior space of hollow partitions having a front wall and a back wall with an anterior space there between typically comprising a base capable of being fixedly attached to the floor, a riser extending upwardly from the base, the riser having a front and rear faces, supporting means can include an annular plate having front and rear faces attached to an upper portion of the riser, the annular plate further having attaching means such as mounting holes for attaching means such as mounting holes for attaching the cover ring to its front face and the junction box to its rear face.

Rose et al., U.S. Pat. No. 4,790,505 describes a sheet metal channel-shaped bracket for supporting an electrical box at a pre-selected height in the wall-framing space between metallic channel-type wall studs affixed to an extending vertically upward from a metallic U-shaped base channel affixed to the floor of a building structure.

Carpenter, U.S. Pat. No. 4,832,297 describes an electrical outlet box installing device including a base portion having a preselected length and width, an upright member affixed to the base portion, the upright member being provided with an arrangement for mounting an electrical outlet box at a preselected height and abutting a first vertical wall, and an arrangement for positioning the upper portion of the upright member a preselected distance from a second vertical wall.

The prior art teaches the use of mechanical brackets for positioning and holding a utility box in a selected place within a wall. Such devices teach the positioning and mounting of such boxes, but fails to teach that a fixture might have a means for holding a box at a particular position in a wall for mounting the box to the wall, and then be able to be easily withdrawn. The prior art also fails to teach the adjustability of such a fixture so as to adapt it for various installations requirements. The present invention fulfills these needs and provides further related advantages as described in the following summary.

SUMMARY OF THE INVENTION

The present invention teaches certain benefits in construction and use which give rise to the objectives described below. The present invention provides a utility box positioning fixture having a box holding means onto which a utility box may be easily placed and held relative to the fixture. A set of jaw and spacer bars are mounted onto a vertically held support bar, the width of the jaw and spacer bars establishing the horizontal position of the utility box relative to a horizontal stringer and a vertical stud of a wall structure. With the utility box positioned against the side surface of the stud, and with the jaw bars positioned against the front face of the stud, the box is positioned for mounting and therefore may be accurately fastened into place on the stud without measurement. In this way a plurality of such utility boxes may be quickly mounted with the assurance that every one of the boxes is at the same height above a floor and at the same horizontal position relative to the wall mounting surfaces presented by the horizontal stringers and vertical studs of the wall frame.

A primary objective of the present invention is to provide a fixture that is used to position a utility box, but is easily withdrawn from the box upon completion of its mounting onto a wall stud or equivalent wall interior structure; such a fixture having advantages not taught by the prior art.

Another objective is to provide such a fixture having means for securing a utility box in such a manner that it may be secured to a wall stud without manually holding the box directly.

Another objective is to provide such a fixture that has the ability to adjust the vertical height and horizontal position of the utility box relative to the floor and the wall studs of the wall structure.

A further objective of the invention is to provide a means for holding a utility box such that the box may be quickly and easily placed onto the fixture, and in which the fixture may be easily withdrawn from the box after the box is mounted in place onto a stud or other mounting element.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings

DETAILED DESCRIPTION OF THE PREFERRED EMBODIMENT

Figure 1:
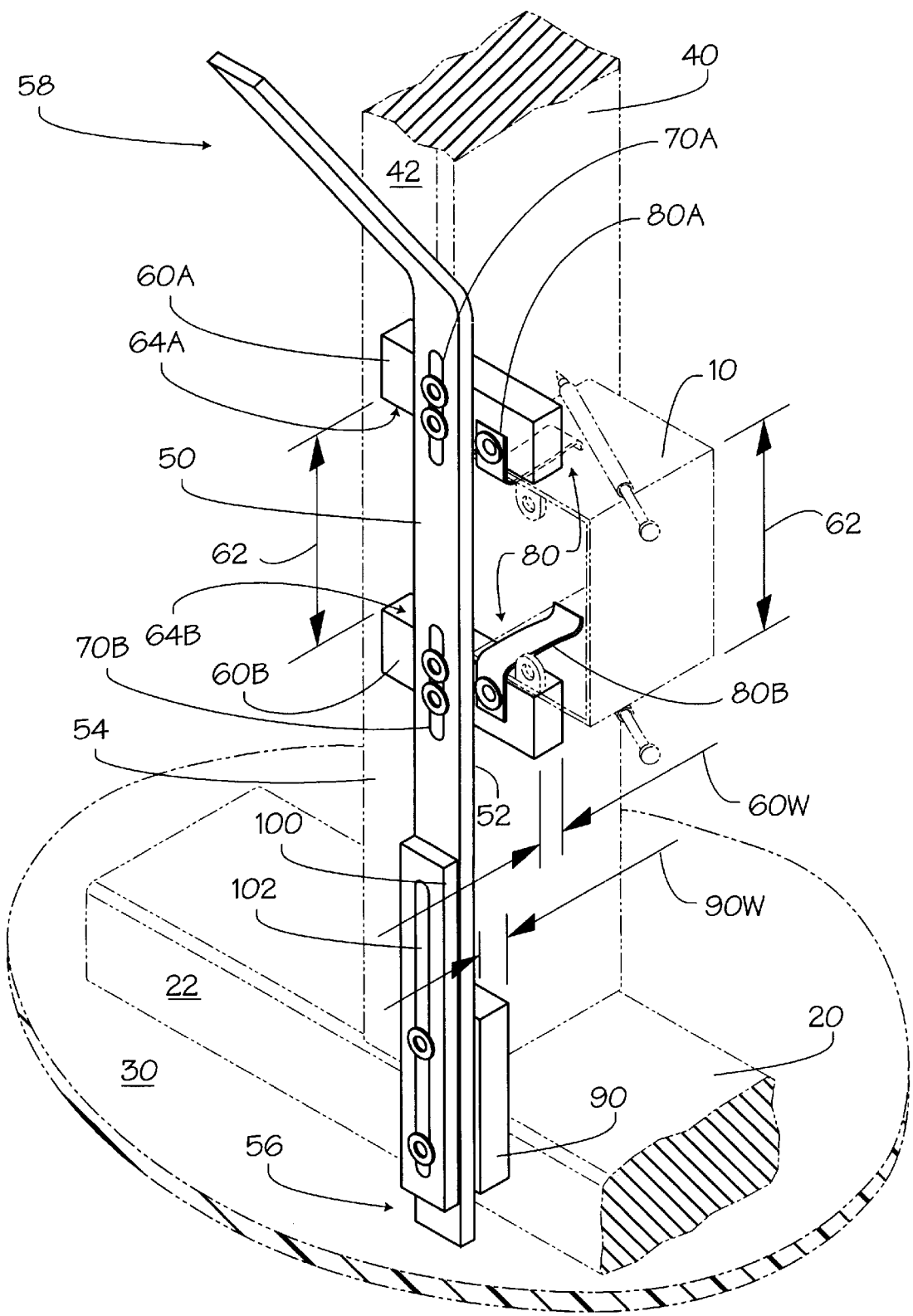
FIG. 1 is a perspective view of the preferred embodiment of the present invention.

The above described drawing figure illustrates the invention, a device for positioning and mounting a utility box 10 with respect to a first vertical surface 22 of a fixed, horizontally oriented, structural element 20 which is mounted on a floor surface 30. This horizontal element 20 is typically a wooden stringer upon which studs are mounted. The utility box is also positioned with respect to a second vertical surface 42 of a fixed, vertically oriented structural element 40, typically such as one of the studs of a typical wall construction.

The invention device includes a vertically oriented support bar 50 having a front face 52 and a rear face 54 in opposition to the front face 52. The support bar further provides a distal end 56 for contact with the floor surface 30, and a proximal end 58 adapted for use as a handle. The proximal end 58 of the support bar 50 is preferably formed at an angle with respect to the distal end 56 so that it is easier to grasp for convenient manual positioning of the utility box. A pair of jaw bars 60A and 60B are mounted on the front face 52 of the support bar 50, in vertically spaced apart positions, and they define a mounting space 62 between them, and further establish an upper and a lower opposing jaw surfaces 64A and 64B. The support bar 50 is preferably adapted for adjustable positioning of the jaw bars 60A and 60B for enabling variability in the mounting space 62 so as to accept utility boxes 10 of various sizes. The jaw surfaces 64A and 64B are normally positioned so that the utility box 10 fits snugly between them and is therefore oriented and held firmly and appropriately with respect to the support bar 50. The jaw bars 60A and 60B have a thickness 60W as required to position the utility box horizontally with respect to the second vertical surface 42, and this thickness 60W is typically the same as the thickness of the wall that is to be mounted onto the frame structure of which the structural element 20 and the stud 40 are a part, although it may differ therefrom for various reasons, such as when it is not desired to have the utility box 10 mounted flush with the outside surface of the wall. It should be noted that the utility box 10 is able to be placed between the jaw bars 60A and 60B, as previously stated, and positioned, as well, against the front face 52 of the support bar. The adaptation of the support bar 50 is preferably a pair of vertically oriented jaw bar mounting slots 70A and 70B in the support bar 50, the slots 70A and 70B providing for vertical positioning of the jaw bars and thus adjustment of space 62, as well as vertical positioning of the utility box 10 above the floor surface 30, in general.

A holding means 80 is fixed to the jaw bars 60A and 60B, and extends outwardly away from the front face 52. The holding means 80 is preferably a pair of leaf springs 80A and 80B positioned for extending into the utility box and for providing pressure against it for holding the utility box on the device. In order to apply pressure to the utility box 10, the leaf springs 80A and 80B are biased such that they require deflection toward each other in order to place the utility box on them. Spring tension, then, provides the force necessary to apply the pressure against the box 10 for holding it in place on the device. A spacer bar 90 is attached to the front face 52 of the support bar 50 at a position adjacent to its distal end 56, whereby with the utility box 10 mounted on the holding means 80 and inserted between the jaw bars 60A and 60B, and with the spacer bar 90 in contact with the first vertical surface 22, and with the jaw bars 60A and 60B in contact with the second vertical surface 42, and the utility box 10 in contact with the vertically oriented structural element 40, the utility box 10 is positioned for mounting to the vertically oriented structural element 40. Typically, the width 90W of the spacer bar 90 is equal to the width 60W of the jaw bars 60A and 60B. By using different sets of bars 90, 60A and 60B of differing thickness 90W and 60W respectively, the horizontal position of the utility box 10 may be set as desired or necessitated by differing wall thicknesses.

The device preferably includes a means for extending 100 of the distal end 56 of the support bar 50 to enable vertical adjustment of the utility box 10. The extending means 100 preferably includes an extension bar adjustably mounted against the rear face 54 of the support bar 50. The extension bar provides a vertically oriented extension bar mounting slot 102, such that the extension bar is positionable for vertically extending the distal end 56 of the device to enable vertical adjustment of the jaw bars 60A and 60B.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A device for positioning and mounting a utility box with respect to a first vertical surface of a fixed, horizontally oriented, structural element arranged in contact with a floor surface, and also with respect to a second vertical surface of a fixed, vertically oriented structural element, the device comprising:

a vertically oriented support bar, the support bar providing a front face, and a rear face in opposition to the front face, the support bar further providing a distal end for contact with the floor surface, and a proximal end adapted for use as a handle;

a pair of jaw bars, mounted on the front face of the support bar, in vertically spaced apart positions, and defining a mounting space therebetween for snugly fitting the utility box, and further establishing an upper and a lower opposing jaw surfaces for contact with the utility box;

a means for holding, fixed to the jaw bars, and extending outwardly therefrom away from the front face;

a spacer bar, the spacer bar attached to the front face of the support bar at a position adjacent to the distal end thereof;

a pair of opposing biasing elements positioned for extending into the utility box for providing pressure thereagainst for holding the utility box on the device;

whereby with the utility box mounted on the opposing biasing elements, and with the spacer bar in contact with the first vertical surface, and with the jaw bars in contact with the second vertical surface, and with the utility box in contact with the vertically oriented structural element, the utility box is positioned for mounting to the vertically oriented structural element.

2. The device of claim 1 wherein the proximal end of the support bar is formed at an angle with respect to the distal end thereby providing improved convenience of the proximal end for use as a handle.

3. The device of claim 1 wherein the support bar is adapted for adjustable positioning of the jaw bars for enabling variability in the mounting space.

4. The device of claim 3 wherein the support bar provides a pair of vertically oriented jaw bar mounting slots in the support bar, the slots providing for vertical positioning of the jaw bars.

5. The device of claim 1 further including a means for extending the distal end of the support bar to enable vertical adjustment of the utility box.

6. The device of claim 5 wherein the extending means is an extension bar adjustably mounted against the rear face of the support bar, the extension bar providing a vertically oriented extension bar mounting slot, such that the extension bar is positionable for vertically extending the distal end of the device to enable vertical adjustment of the jaw bars.

* * * * *